S. Brackett,

Cutlery Scourer,

No. 1,134, Patented Feb. 5, 1861.

Witnesses

R. H. Ely

G. P. Hale Jr.

Inventor

Sewall Brackett

UNITED STATES PATENT OFFICE.

SEWALL BRACKETT, OF FALL RIVER, MASSACHUSETTS.

IMPROVED KNIFE AND FORK CLEANER.

Specification forming part of Letters Patent No. 27,773, dated April 10, 1860; Reissue No. 1,134, dated February 5, 1861.

*To all whom it may concern:*

Be it known that I, SEWALL BRACKETT, of Fall River, in the county of Bristol and State of Massachusetts, have invented a new and useful or Improved Machine for Scouring or Cleaning Knives or Forks; and I do hereby declare the same to be fully described in the following specification and illustrated in the accompanying drawings, of which—

Figure 1:
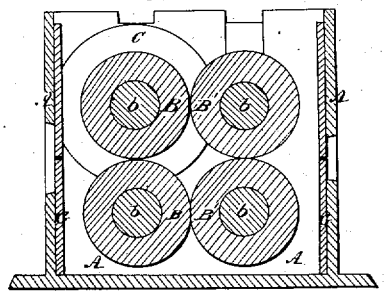
Figure 2:
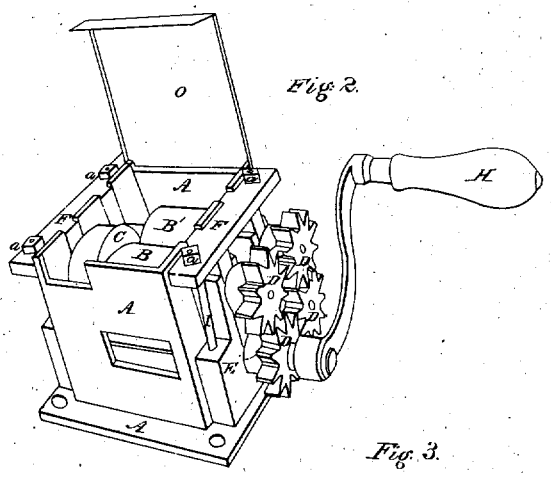
Figure 3:
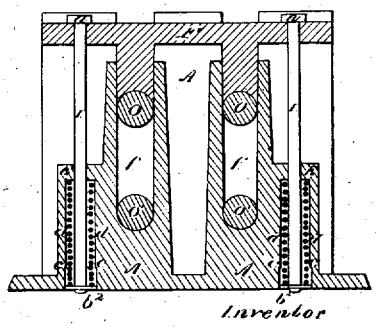

Figure 1 is a longitudinal section, and Fig. 2 a perspective view, of it. Fig. 3 is a sectional elevation of one side of the frame of the machine, and made so as to exhibit the springs and rods of one of its saddles or bars F, to be hereinafter described.

The nature of my invention consists of a machine or combination formed of two scouring-rollers, B B, a box or trough, A, an auxiliary set of scouring and counteracting rollers, B′ B′, and four gears, (or mechanical equivalents for such gears,) arranged and combined in manner and so as to operate substantially as hereinafter explained, such machine being hereinafter represented as not only furnished with a fork-cleaning roller applied to the axle of its rearmost set of rollers, but with an arrangement of saddles and springs and spring-cases, as combined with its box or trough, the knife-cleaning rollers, and their gears.

The box or trough of the machine is exhibited in the drawings at A, its purpose being to contain the scouring powder or material to be supplied to the two sets of rollers B B B′ B′, the lower roller of each set of such rollers being arranged within such trough, the sides of which project upward and constitute with the trough a frame for supporting the bearings of the rollers. Each set of such rollers consists of two rollers, one being placed directly above the other. The front set, B′ B′, of the said rollers I term the "auxiliary" rollers. While the machine is in operation they are to be revolved in directions contrary to those of the rollers B B, in order that they (the said auxiliary rollers) may not only perform the function of scouring opposite surfaces of a knife-blade, but that of counteracting the tendency of the rollers B B to force the knife forward without scouring it. When a knife-blade is presented to the bite of the two rollers B B, while they and the rollers B′ B′ may be in revolution, as described, it will be seized and forced forward into the bite of the said auxiliary rollers. These latter rollers then not only operate to counteract the further advancement of the knife by the rollers B B, but scour or clean such knife on its opposite sides. At the same time the rollers B B (by reason of the advance of the knife being so stopped) will revolve against the knife, and, in their turn, scour or cleanse its opposite flat surfaces.

In order that the rollers B B B′ B′ may operate as described, there is placed upon the shaft of each a gear, D, and the several gears D D D D are arranged as shown in Fig. 2—viz., so that each shall not only engage with that one which is directly over or under it, but with that one which is next aside of it. A crank, H, is fastened on the shaft of the lower roller of the rearmost set, B B.

A fork-cleaning roller is represented at C in Figs. 1 and 2 as applied to the shaft of the upper roller B, and against one end of such roller. It has a diameter greater than that of the said roller B, and extends nearly down to the shaft of the lower roller B, and so as to enter the trough sufficiently to run in the cleaning powder or material when the latter is filled to a proper height in the trough.

Each of the rollers B B′ C, I usually make either in whole or in part of some elastic or yielding material—such as leather or caoutchouc—and so that the grinding-surface of the roller may be more or less elastic, and capable not only of raising the scouring material from the trough, but of retaining on itself more or less of it for the purpose of effecting the cleansing or scouring of a knife, when such knife is against such surface and the latter is in rotation.

The upper rollers B B′ are forced down toward the lower ones by two saddles or bars, F F, each of which is formed and applied to the journals of the shafts of the said upper rollers B B′ as shown in Figs. 2 and 3, in the latter of which O O are the shafts of the two upper rollers B B′, while O′ O′ are those of the other rollers B B′. From each saddle F two rods or bolts, I I, extend downward into and through two helical springs, *d d*, and their cases E E, the same being as shown in Fig. 3. These rods are provided at their upper ends with heads or nuts *a a* to rest on the saddle F. Similar heads or washers, $b^2$ $b^2$, are fastened on the lower ends of the rods I I, and serve as supports to the lower ends of the springs *d d*. These springs respectively envelop the rods and bear against the upper parts of the cases or chambers E E. Each spring case or chamber has its lower part enlarged and formed with a shoulder, *c*, as shown in Fig. 3. Against such shoulder the washer or head $b^2$ stops or abuts, so as to prevent the saddle from being elevated high enough for the gears to become disengaged.

In order to prevent the escape of the scouring material through the journal-openings made in the sides of the box A, as shown in Fig. 3, a lining of leather or other suitable material may be placed against the openings and between them and the ends of the rollers. So, if desirable, the frame or box A may be provided with a cover, *o*, suitably applied thereto.

In using the above described machine, while its crank is being turned the knife to be scoured is to be inserted, point or end forward, between the receiving-rollers B B and the auxiliary rollers B′ B′. As the two sets of rollers revolve in such directions as to overcome the tendency of the receiving-rollers B B to advance the knife beyond the bite of the auxiliary rollers, its further movement between the rollers must be effected by force applied to its handle.

When but one pair of rollers is employed, their tendency to draw the knife forward has to be counteracted by the person who may have hold of the knife. It is often very difficult for him to do this, or prevent the knife at the bolster from being so drawn between the rollers as to seriously injure them or it.

In my machine the knife, after having been seized by both sets of rollers, can be moved forward and afterward drawn backward between the rollers, as circumstances may require.

In order to scour a fork, it is to be borne against and moved forward and backward on (as circumstances may require) the periphery of the wheel C while the said wheel may be in revolution. I deem the wheel C a valuable addition to my machine.

I do not claim the combination of one set of rollers and a trough, the rollers being geared together, and the lower one being arranged in the trough, the whole forming a machine for cleansing or scouring a knife-blade.

I claim—

My improved scouring-machine as composed of the two rollers B B, the trough A, the auxiliary or scouring and counteracting rollers B′ B′, and the four connecting-gears D D D D, (or mechanical equivalents for such gears,) arranged and combined substantially in the manner and so as to operate together as specified.

SEWALL BRACKETT.

Witnesses:
R. H. EDDY,
F. P. HALE, Jr.